United States Patent Office 3,441,327
Patented Apr. 29, 1969

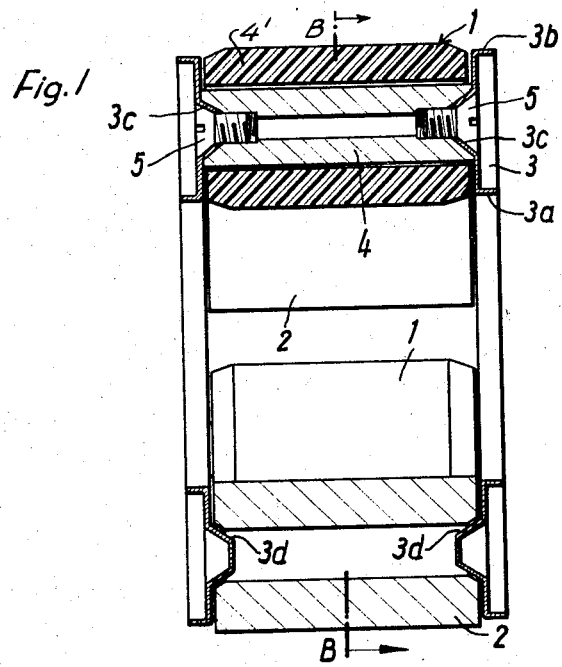
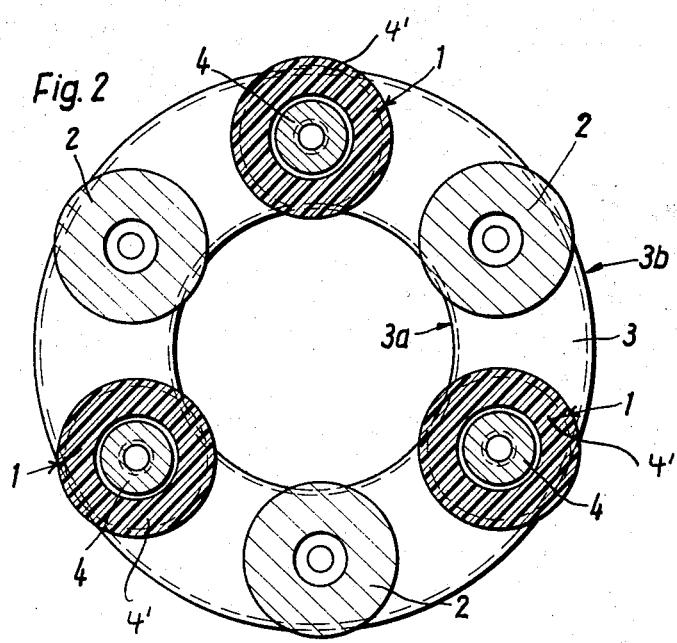

3,441,327
ROLLER BEARING
Oskar Erich Peter, Brackenheim, Wurttemburg, and Lothar Peter, Guglingen, Wurttemburg, Germany, assignors to Peter KG, Brackenheim, Wurttemburg, Germany
Filed Dec. 13, 1967, Ser. No. 690,226
Claims priority, application Germany, July 27, 1967, P 42,690
Int. Cl. F16c *19/26*
U.S. Cl. 308—217                          11 Claims

ABSTRACT OF THE DISCLOSURE

A roller bearing is disposed between two relatively rotatable members and comprises a cage which includes two axially spaced annular members disposed in parallel planes and adapted to surround one of the rotatable members and be in turn surrounded by the other of the rotatable members. A plurality of roller elements are arranged intermediate the annular members connected to the same with equidistant angular spacing and with freedom of rotation about respective axes which parallel the axis which is common to the annular members. Some of these roller elements consist of synthetic plastic material and have a diameter which is slightly greater than the corresponding dimension of the other roller elements.

Background of the invention

The present invention relates generally to a roller bearing, and more particularly to a roller bearing of the type which can be arranged directly between two relatively rotatable members.

Conventional roller bearings comprise races on which the roller elements turn. In certain applications, the presence of such races is undesirable and it is preferred that the roller elements roll on surfaces of the two relatively rotatable members between which the bearing is to be disposed, such surfaces then constituting in effect the races so that separate races can be eliminated. However, roller bearings of this type which are currently known to us suffer from a variety of disadvantages, including complexity and high expense resulting therefrom. They are, furthermore, insufficiently resistant to torsional forces and must be lubricated to prevent overheating.

Summary of the invention

The present invention overcomes these disadvantages.

More particularly, the present invention provides a roller bearing, which is not only particularly light and resistant to wear, but which is also resistant to torsional forces, consists of a relatively small number of components and is therefore simple and inexpensive to manufacture, but which also requires no maintenance and is capable of quickly dissipating heat resulting during use.

In accordance with one feature of our invention we provide a roller bearing, particularly suitable for arrangement directly between two relatively rotatable members, which includes a cage comprising two axially spaced annular members which are disposed in parallel planes. The cage of course is adapted to surround one of the rotatable members and in turn to be surrounded by the other of these rotatable members. A plurality of roller elements is arranged intermediate the annular members connected to the same and with freedom of rotation about respective axes which parallel the axis which is common to the annular members. These roller elements are arranged with equidistant angular spacing and their diameter is so selected as to be in rolling engagement with the two relatively rotatable members between which the bearing is arranged. Some of the roller elements consist of synthetic plastic material which is self-lubricating and these have a diameter slightly greater than the corresponding dimension of the remaining roller elements.

By providing the roller elements which consist of synthetic plastic material, from a self-lubricating synthetic plastic material and by at the same time making their diameter slightly larger than the corresponding dimension of the remaining roller elements, we obtain a slight plastic deformation of these synthetic plastic roller elements when the bearing is introduced between the two relatively rotatable members. Such deformation may result in imparting a slightly oval cross-sectional configuration to the synthetic plastic roller elements and the purpose is not only to obtain precise centering of the bearing with reference to the two relatively rotatable members, but also to make use of the self-lubricating effect of the synthetic plastic. Evidently, the plastic material will, by virtue of its self-lubricating character, compensate for whatever surface roughness exists on the two relatively rotatable members. This means that these surfaces need no longer be subjected to the precision finishing which was heretofore required, and it represents a considerable manufacturing economy. In fact, these surfaces need be given only relatively little surface treatment because, if the surface is still fairly rough when the bearing is put in place, a comparatively thick layer of the self-lubricating plastic will build up on the surfaces which enhances the smoothness and quiteness of operation considerably. It also serves to equalize uneven surface areas.

The roller elements of synthetic plastic material are disposed intermediate the remaining roller elements which consist in conventional manner of metallic material. In other words, roller elements of synthetic plastic material and such consisting of metallic material alternate with one another in the circumferential direction of the respective annular members. Because all of the roller elements are equidistantly spaced, and because the adjacent roller elements are out of contact with one another, the undesirable friction which has always been found in the type of bearing where the roller elements engage one another and roll on one another, is avoided. Furthermore, the provision of roller elements of self-lubricating synthetic plastic material makes it unnecessary to subject the roller elements of metallic material to the precise surface treatment which was heretofore required. The reasons are the same as those which make it possible to eliminate such surface treatment for the rolling surfaces of the two relatively rotatable members, namely the surfaces of the roller elements of metallic material will be coated with a layer of the self-lubricating synthetic plastic material. Again, this not only significantly reduces frictional resistance, but also quits the operation of the novel roller bearing.

To significantly reduce the weight of the entire bearing it is advantageous that at least the roller element consisting of metallic material be made from an aluminum alloy which is highly resistant to wear. In fact, it is advantageous that all parts of the roller bearing other than the roller elements of synthetic plastic material consist of such aluminum alloy. To further enhance the resistance of the aluminum alloy to wear, these parts may be subjected to a surface treatment, for instance to a chemically applied nickel coating or to hard anodizing. The use of aluminum guarantees good thermal conductivity so that frictional heat which develops during operation of the roller bearing is dissipated quickly and to a sufficient extent to prevent overheating of the bearing. Steel could also be used instead of the aluminum, but the lower modulus of elasticity of a suitable aluminum alloy which may for instance be E=700000 kg./cm.$^2$ as compared to E=2100000 kg./cm.$^2$ for steel, is particularly advantageous for the metal rolling elements which evidently will have a modulus of elasticity three times greater than if it were made of steel.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

*Brief description of the drawing*

FIG. 1 illustrates a bearing according to my present invention in an axial section; and FIG. 2 is a section taken on the line B—B of FIG. 1.

*Description of the preferred embodiments*

Discussing now the drawing in detail, it is to be noted that our novel bearing comprises two annular members or end rings 3 of metallic material. Advantageously these end rings are manufactured by a stamping and forming process and it will be seen that they are of substantially U-shaped cross section being provided with respective closed sides which face one another and with open sides which face away from one another in axial direction of the bearing. This cross-sectional configuration is obtained by bending over the edge portions 3a and 3b of the respective end rings so that they extend outwardly as illustrated in FIG. 1. The bottom wall of the respective end rings 3 is provided with a plurality of equidistantly angularly spaced frustoconical projection 3c and 3d which can be provided on the rings 3 simultaneously with the shaping of the edge portions 3a and 3b thereof. It will be noted that whereas the projections 3c have open inner ends, the inner ends of the projections 3d are closed. The projections 3c alternate with the projections 3d in circumferential direction of the respective rings 3.

A plurality of metallic roller elements 2 are provided in their respective end faces with axial recesses configurated to accept two axially aligned projections 3d of the respective end rings 3. These recesses are so configurated (compare FIG. 1) that the rolling elements 2 have a small amount of freedom of radial play on the projections 3d. The rolling elements 2 are held in position between the respective rings 3c only by being mounted on the projections 3d in the manner illustrated in FIG. 1.

Between each pair of the rolling elements 2 (compare FIG. 2) is arranged a rolling element 1. These rolling elements 1 consist, as is most clearly evident from FIG. 1, of an inner cylindrical section 4 and an outer tubular section 4' which coaxially surrounds the respective inner cylindrical section 4 with freedom of rotation relative thereto. The inner cylindrical sections 4 may consist of various suitable materials, for instance a metallic material corresponding to that of the roller elements 2, and serve as distancing elements. It is the axial end faces of the sections 4 which are provided with recesses configurated so as to accept the projections 3c of the end rings 3. Unlike the roller elements 2, however, the sections 4 of the roller elements 1 are rigidly connected to the respective rings 3 by means, for instance, of screws which extend through the projections 3c into the sections 4 where they engage and mesh with screw threads provided for this purpose. Thus, the sections 4 are non-rotatably connected to the end rings 3, and connect the same against twisting under torsional forces maintaining them at a predetermined spacing and preventing dislodging of the rolling elements 2.

The sections 4' which surround the respective sections 4 consist of synthetic plastic material which, in accordance with the present invention, is a self-lubricating synthetic plastic material. By way of example, it is mentioned that one such material suitable for this purpose is commercially available under the trade name Teflon. It will be noted that the sections 4' have slight freedom of radial play with reference to the sections 4 as shown particularly in FIG. 1. This figure also shows that the sections 4' have a slight taper at their respective axial ends to facilitate insertion between the respective relatively rotatable members.

In accordance with the present invention the diameter of the sections 4' is somewhat greater than the corresponding dimension of the rolling elements 2. The purpose of this is to assure that the sections 4' will be subjected to slight elastic deformation, for instance into a substantially oval cross-sectional configuration wherein the bearing is inserted between the relatively rotatable members and by engagement with the rolling surfaces on these relatively rotatable members. This insures on the one hand, precise centering of the roller bearing between the two relatively rotatable members, thereby avoiding the possibility of radial play, and on the other hand, it assures that sufficiently strong frictional contact exists between these rolling surfaces and the sections 4' so that some of the self-lubricating synthetic plastic material of which the latter consists, will wear off and coat the rolling surfaces of the relatively rotatable members, thereby eliminating any surface roughness existing on these surfaces. It is for this reason, that, as already pointed out earlier, these surfaces need not be as precisely machined as was heretofore necessary. Of course, some of the synthetic plastic material which wears off the sections 4' and coats the rolling surfaces of the two relatively rotatable members will also adhere to the contact surfaces, namely the peripheral surfaces of the rolling elements 2. The latter are thus also coated with this material and all of this contributes to a quite operation of the novel bearing to an ability to operate trouble-free without lubrication for extended periods of time, and to a reduction in friction. The bearing according to the present invention is therefore maintenance free for all practical purposes.

As pointed out earlier, the rolling elements 2 advantageously consist of a highly wear resistant aluminum alloy and it is further advantageous that the end rings 3, the sections 4 and the screws 5 be provided of the same material for the reasons set forth earlier. This aluminum alloy may be subjected to a surface treatment to further enhance the wear resistance thereof, for instance it may be coated with a layer of nickel by a chemical coating process, or it may be subjected to hard-anodizing.

The roller bearing in accordance to the present invention will, it will be understood, not only be much lighter and much less complicated than known conventional constructions, but it will also be considerably less expensive to manufacture, it will run more quietly, it will have better ability for heat dissipation, it will be subject to less friction, and it will require considerably less maintenance than heretofore necessary.

It will be understood that each of the elements described above, or two or more together, may also find a useful application in other types of bearings, differing from the types described above.

While the invention has been illustrated and described as embodied in a roller bearing, it is not intended to be limited to the details shown, since various modifications and structural changes may be made without departing in any way from the spirit of the present invention.

What is claimed as new and desired to be protected by Letters Patent is set forth in the appended claims.

We claim:

1. A roller bearing particularly for arrangement directly between two relatively rotatable members, comprising, in combination, a cage including two axially spaced annular members disposed in parallel planes, said cage being adapted to surround one of said rotatable members and to be surrounded by the other of said rotatable members; and roller elements arranged intermediate said annular members connected to the same with freedom of rotation about respective axes paralleling the axis common to said annular members, all of said roller elements being arranged with equidistant angular spacing and having a diameter so selected as to be in rolling engagement with two relatively rotatable members between which said bearing is arranged, a first plurality of roller elements consisting at least in part of synthetic plastic material and having a diameter slightly greater than the corresponding dimension of the roller elements of the remaining second plurality of said roller elements.

2. A roller bearing as defined in claim 1, wherein said annular members consist of metallic material.

3. A roller bearing as defined in claim 1, wherein said annular members are of U-shaped cross-section and each have a closed side and an open side which latter faces axially away from the other member, each of said members being provided at the respective closed side thereof with a plurality of angularly equidistantly spaced projections extending in direction toward the other member; and wherein said roller elements have opposite axial endfaces each provided with a recess adapted to receive one of said projections therewithin.

4. A roller bearing as defined in claim 3, wherein said roller elements of said first plurality each consist of an inner cylindrical metallic portion provided with said recesses, and an outer tubular section of said synthetic plastic material surrounding said inner cylindrical sections with freedom of rotation relative thereto; and further comprising connecting means rigidly connecting the respective inner cylindrical sections to said annular members.

5. A roller bearing as defined in claim 4, wherein said roller elements of said second plurality consist of metallic material, one of said roller elements of said first plurality being arranged intermediate every angularly spaced pair of roller elements of said second plurality.

6. A roller bearing as defined in claim 5, wherein the recesses provided in the axial endfaces of said roller elements of said second plurality are so dimensioned as to permit slight radial play of the respective roller elements of said second plurality with reference to the associated projections.

7. A roller bearing as defined in claim 6, wherein said roller elements of said second plurality consist of a wear-resistant aluminum alloy.

8. A roller bearing as defined in claim 7, wherein said aluminum alloy comprises a wear resistant surface coating for further enhancing the resistance to wear of said roller elements of said second plurality.

9. A roller bearing as defined in claim 8, wherein said surface coating is a nickel coating.

10. A roller bearing as defined in claim 1, wherein said synthetic plastic material is a self-lubricating synthetic plastic material.

11. A roller bearing as defined in claim 10, wherein said synthetic plastic material is Teflon.

References Cited

UNITED STATES PATENTS 2,724,624 11/1955 Barr _____ 308—200
859,347 7/1907 Sleenstrup _____ 308—217

FRANK SUSKO, *Primary Examiner.*

EVERETTE A. POWELL, JR., *Assistant Examiner.*